United States Patent
Tadera et al.

(10) Patent No.: US 6,753,496 B2
(45) Date of Patent: Jun. 22, 2004

(54) PLASMA PROCESSING APPARATUS

(75) Inventors: Takamitsu Tadera, Tenri (JP); Tatsushi Yamamoto, Ikoma-gun (JP); Masaki Hirayama, Sendai (JP); Tadahiro Ohmi, 2-1-17-301, Komegafukuro, Aoba-ku, Sendai (JP)

(73) Assignees: Sharp Kabushiki Kaisha, Osaka (JP); Tadahiro Ohmi, Miyagi (JP)

(*) Notice: Subject to any disclaimer, the term of this patent is extended or adjusted under 35 U.S.C. 154(b) by 120 days.

(21) Appl. No.: 10/010,383

(22) Filed: Dec. 7, 2001

(65) Prior Publication Data

US 2002/0079294 A1 Jun. 27, 2002

(30) Foreign Application Priority Data

Dec. 13, 2000 (JP) .......................... 2000-378506

(51) Int. Cl.⁷ .............................................. B23K 10/00
(52) U.S. Cl. ................... 219/121.43; 219/121.54; 118/723 MW; 204/298.38
(58) Field of Search ............... 219/121.43, 121.54, 219/121.52, 121.47, 121.51, 121.55; 118/723 MW, 723 ME, 723 I, 723 E, 715, 725, 728; 315/111.41, 111.21; 156/345.21, 345.41; 427/255.6, 384, 487, 526; 204/298.38, 192.35

(56) References Cited

U.S. PATENT DOCUMENTS

| 4,727,293 A | * | 2/1988 | Asmussen et al. | ...... 315/111.41 |
| 5,861,601 A | * | 1/1999 | Sato et al. | ............. 219/121.43 |
| 5,874,706 A | * | 2/1999 | Ishii et al. | ............. 219/121.43 |

FOREIGN PATENT DOCUMENTS

| JP | 05036641 | 2/1993 |
| JP | 9-232099 | 9/1997 |
| JP | 2000-91097 | 3/2000 |

* cited by examiner

*Primary Examiner*—Quang T. Van
(74) *Attorney, Agent, or Firm*—Edwards & Angell, LLP; David G. Conlin; Lisa Swiszcz Hazzard

(57) ABSTRACT

On one side of a microwave entrance window that is exposed to the atmosphere, a slot plate having slots and a resonant unit are provided. The slot plate and the resonant unit are integrally placed to be slidable by linear guides with respect to a process chamber. In this way, a plasma processing apparatus can be provided that performs a highly uniform plasma process and is excellent in terms of plasma generation property.

5 Claims, 15 Drawing Sheets

PLASMA PROCESSING APPARATUS

BACKGROUND OF THE INVENTION

1. Field of the Invention

The present invention relates to plasma processing apparatuses. In particular, the present invention relates to a plasma processing apparatus such as etching, film deposition and ashing apparatuses used for manufacturing semiconductor devices or liquid crystal display devices, for example.

2. Description of the Background Art

A plasma process by means of microwave now captures attention as that is applicable to a low-temperature plasma process for a semiconductor device or TFT (thin film transistor) liquid crystal display device for example. What is important here is that such a plasma process is uniformly carried out for a substrate. In addition, under a low gas-pressure condition of 0.133 Pa or lower, discharge tends to be difficult to start. This tendency is pronounced particularly when a gas with a high ionization voltage is used.

These problems are addressed as disclosed in Japanese Patent Laying-Open Nos. 5-36641 and 2000-91097 showing methods for achieving uniform plasma and in Japanese Patent Laying-Open No.9-232099 showing a method for improving a plasma generation property.

The method disclosed in Japanese Patent Laying-Open No. 5-36641 is described below.

FIG. 13 is a schematic cross section showing a structure of a plasma processing apparatus disclosed in Japanese Patent Laying-Open No. 5-36641. Referring to FIG. 13, a chamber body 101 and a dielectric plate 103 are sealed by an O-ring (not shown) in order to isolate a process chamber 100 from the atmosphere. The air inside the process chamber 100 is discharged by an exhaust device (not shown) until a predetermined vacuum pressure is attained. Then, a process gas is supplied from a gas inlet 109 into process chamber 100. A microwave generated by a microwave generator (not shown) is thereafter supplied through a waveguide 106 into a microwave stirrer chamber 102. An impeller 108 is rotated by a drive motor 107 to stir and disperse the microwave within microwave stirrer chamber 102. The stirred microwave is passed through dielectric plate 103 into process chamber 100. The process gas is thus excited to generate plasma. This plasma is used to plasma-process a substrate 105 held on a substrate holder 104.

Japanese Patent Laying-Open No. 2000-91097 discloses a technique as discussed below.

FIGS. 14 and 15 are schematic cross sectional and plan views respectively of a structure of a plasma processing apparatus disclosed in Japanese Patent Laying-Open No. 2000-91097. Referring to FIGS. 14 and 15, the air inside a process chamber 100 is discharged by an exhaust device (not shown) until a predetermined vacuum pressure is attained, and a process gas is thereafter supplied from a gas inlet 109. A microwave generated by a microwave generator 122 is guided though a waveguide 114 and a dielectric line 115 to the top of process chamber 100. The microwave radiated from dielectric line 115 is passed though a microwave dispersion plate 120 formed of three plates stacked on each other as well as a microwave entrance window 116 into process chamber 100 for generating plasma from the process gas. Then, a substrate 105 held on a substrate holder 104 is plasma-processed.

Microwave dispersion plate 120 is constituted of two dielectric plates 117 and 119 and a plurality of thin aluminum sheets 118 arranged at certain intervals between the two dielectric plates, and this microwave dispersion plate 120 serves to disperse the microwave.

Japanese Patent Laying-Open No. 9-232099 discloses a technique as described below.

FIG. 16 is a schematic cross section showing a structure of a plasma processing apparatus disclosed in Japanese Patent Laying-Open No. 9-232099. Referring to FIG. 16, the air inside a process chamber 100 is discharged by an exhaust device (not shown) until a predetermined vacuum pressure is attained and then a process gas is supplied from a gas inlet 109. A microwave generated by a microwave generator 123 is guided through a waveguide 124 via a matching unit 125 to the top of a microwave entrance window 126. Then, the microwave is passed through microwave entrance window 126 made of dielectric to be radiated into process chamber 100. On one side of microwave entrance window 126 that faces process chamber 100, a depression 126a is provided. The process gas supplied from gas inlet 109 into process chamber 100 is excited by the microwave radiated from microwave entrance window 126 to generate plasma. Then, a substrate 105 on a substrate holder 104 is plasma-processed.

Depression 126a which deforms microwave entrance window 126 can cause plasma concentration so that the plasma generation property can be improved.

However, the plasma process is difficult to make uniform by the methods described above when the methods are used for a TFT liquid crystal display device with a substrate of a size ranging from 500×500 mm to 1 m×1 m. There are thus problems in respective methods described above.

In the apparatus of Japanese Patent Laying-Open No. 5-36641, the microwave is stirred by impeller 108 and then supplied into process chamber 100. This is effective to some degree for circular substrate 105. However, the microwave uniformity is unsatisfactory for a rectangular substrate. Moreover, although impeller 108 is advantageously used to apply the microwave almost uniformly to a substrate of a small area, such a microwave is difficult to apply to a rectangular substrate of a large area. In other words, it is considerably difficult to design stirrer chamber 102 and impeller 108 that are to be used for uniformly supplying the microwave into process chamber 100.

A plurality of stirrer chambers 102 and impellers 108 might be provided. However, problems arise in terms of control of impellers 108 and maintenance.

In the apparatus of Japanese Patent Laying-Open No. 2000-91097, the microwave is dispersed by microwave dispersion plate 120. The performance of microwave dispersion plate 120 is determined by the thickness and arrangement of aluminum sheets 118 between two dielectric plates 117 and 119. However, optimization of the thickness and arrangement of aluminum sheets 118 for the purpose of dispersing and uniformly supplying the microwave is difficult to accomplish. In addition, it is hard to produce microwave dispersion plate 120 which is applicable to large-area substrates.

This plasma processing apparatus uses dielectric line 115 from which the microwave is supplied. Dielectric line 115 guides the microwave generated by generator 122 to the top of process chamber 100 so as to radiate the microwave into chamber 100 from a radiation plate which is larger in size than substrate 105. Dielectric line 115 is made of dielectric such as Teflon (trade name) that includes a tapered portion T with its width increasing from the one on one end corresponding to the width of the output opening of generator 122 to the width on the other end corresponding to the width of the microwave radiation portion. In order to transmit the microwave without change of the propagation mode, tapered portion T of dielectric line 115 should gradually be tapered. Then, in order to adapt dielectric line 115 to a large-area substrate, tapered portion T is made considerably long. Consequently, when the apparatus is used for a large substrate 105, the apparatus increases in size to occupy a large installation area.

In the apparatus of Japanese Patent Laying-Open No. 9-232099, depression 126a is provided as shown in FIG. 16 on the side of microwave entrance window 126 that faces process chamber 100 in order to improve the plasma generation property. Depression 126a is utilized to cause, in process chamber 100, a high field-intensity region to be generated near depression 126a in order to facilitate plasma generation.

The presence of the high field-intensity region in the apparatus certainly improves the plasma generation property. However, the region where the field intensity is high remains near depression 126a even after the plasma is generated. Accordingly, the plasma density in that region is high which makes it impossible to uniformly distribute the plasma and thus to uniformly perform a plasma process for substrate 105.

SUMMARY OF THE INVENTION

One object of the present invention is to provide a plasma processing apparatus achieving a high uniformity in terms of a plasma process.

Another object of the present invention is to provide a plasma processing apparatus having an improved plasma generation property.

According to one aspect of the present invention, a plasma processing apparatus includes a process chamber, a microwave supply unit, a slot plate, and a slide unit. The process chamber is provided for processing by means of plasma. The microwave supply unit has a resonant unit oscillating microwave to supply the oscillated microwave into the process chamber. The slot plate is provided between the resonant unit and the process chamber and includes an opening for passing the oscillated microwave to the process chamber. The slide unit slides the resonant unit and the slot plate all together with respect to the process chamber.

The plasma processing apparatus according to the one aspect of the invention slides the resonant unit and slot plate all together to achieve a uniform plasma process.

According to another aspect of the present invention, a plasma processing apparatus includes a process chamber, a microwave supply unit, a first slot plate, a second slot plate, a slot plate drive unit, and a slide unit. The process chamber is provided for processing by means of plasma. The microwave supply unit has a resonant unit oscillating microwave to supply the oscillated microwave into the process chamber. The first slot plate provided between the resonant unit and the process chamber includes a plurality of first openings for passing the oscillated microwave to the process chamber. The second slot plate includes a plurality of second openings provided at respective positions corresponding to respective positions of the first openings. The slot plate drive unit slides the second slot plate with respect to the first slot plate according to a plasma state within the process chamber. The slide unit slides the resonant unit and the first slot plate all together with respect to the process chamber.

The plasma processing apparatus according to that another aspect of the invention slides the resonant unit and the first slot plate all together to achieve a uniform plasma process. In addition, the plasma processing apparatus has the second slot plate slidable with respect to the first slot plate, and thus the number of opening slots can be reduced when the plasma is generated, which facilitates plasma generation.

Preferably, according to that another aspect of the invention, the second openings include a large-dimension opening having a large opening dimension in a slide direction in which the second slot plate is slid and a small-dimension opening having a small opening dimension in the slide direction. When the plasma is generated, the second slot plate is positioned to allow the large-dimension opening to overlap any of the first openings and allow the small-dimension opening to overlap none of the first openings. After plasma generation is recognized, the second slot plate is positioned to allow the large-dimension opening and the small-dimension opening to overlap the first openings respectively.

When the plasma is to be generated, there are thus a reduced number of exposed openings to cause power concentration which ensures plasma generation. After the plasma is generated, the generated plasma is maintained while the number of exposed openings is increased. Then, the power is uniformly supplied to process a substrate uniformly by the plasma.

Preferably, according to that one and another aspects of the invention, a plasma state detection unit detecting a plasma state within the process chamber is further provided. According to information about the plasma state supplied from the plasma state detection unit, the speed at which the resonant unit is slid by the slide unit can be changed.

In this way, the slide speed of the resonant unit is adjusted according to the plasma state for uniformly processing a substrate by the plasma.

Preferably, according to that one and another aspects of the invention, according to information about the plasma state supplied from the plasma state detection unit, the intensity of the microwave supplied by the microwave supply unit into the process chamber is adjusted.

The intensity adjustment of the supplied microwave according to the plasma state makes it possible to uniformly process a substrate by the plasma.

Preferably, according to that one and another aspects of the invention, the plasma state detection unit is a device for measuring the intensity of plasma radiation.

The plasma state can thus be detected easily by means of the plasma radiation intensity.

Preferably, according to that one aspect of the invention, the distance over which the resonant unit and the slot plate are slid by the slide unit is made smaller than the pitch between the openings.

The slide distance is smaller than the opening pitch and thus a substrate can uniformly be processed by the plasma.

Preferably, according to that another aspect of the invention, the distance over which the resonant unit and the first slot plate are slid by the slide unit is made smaller than the pitch between the first openings.

The slide distance is smaller than the pitch between the first openings and thus a substrate can uniformly be processed by the plasma.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described in conjunction with the drawings.

First Embodiment

Figure 1:
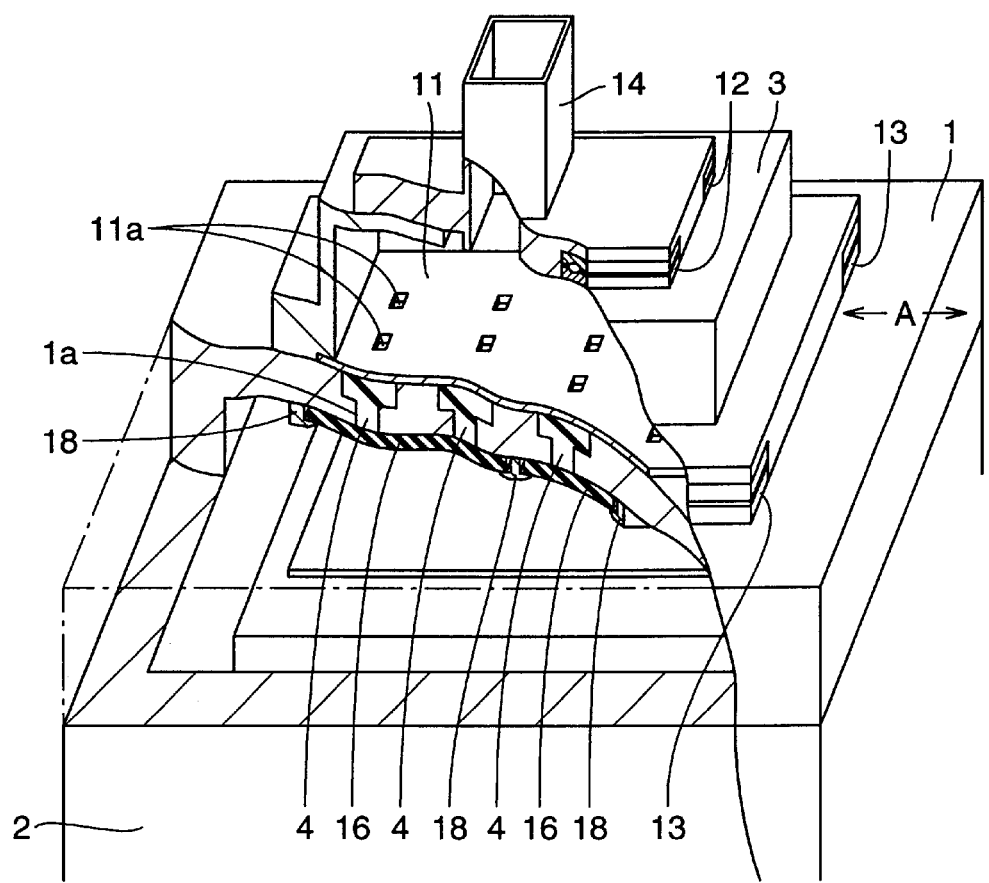
FIG. 1 is a schematic perspective view with a partial cross section showing a structure of a plasma processing apparatus according to a first embodiment of the present invention.
Figure 2:
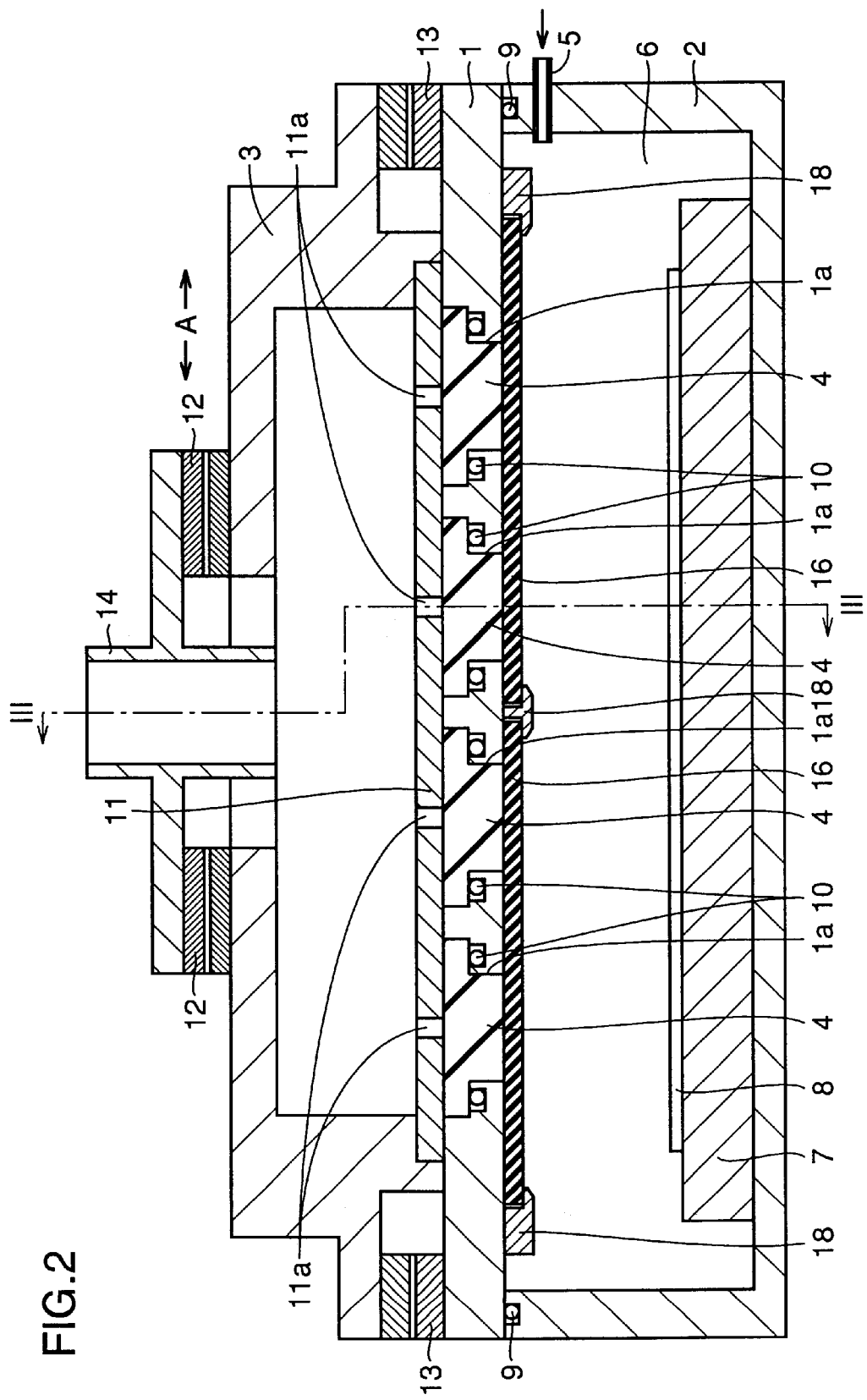
FIG. 2 is a schematic cross section showing the structure of the plasma processing apparatus of the first embodiment.
Figure 3:
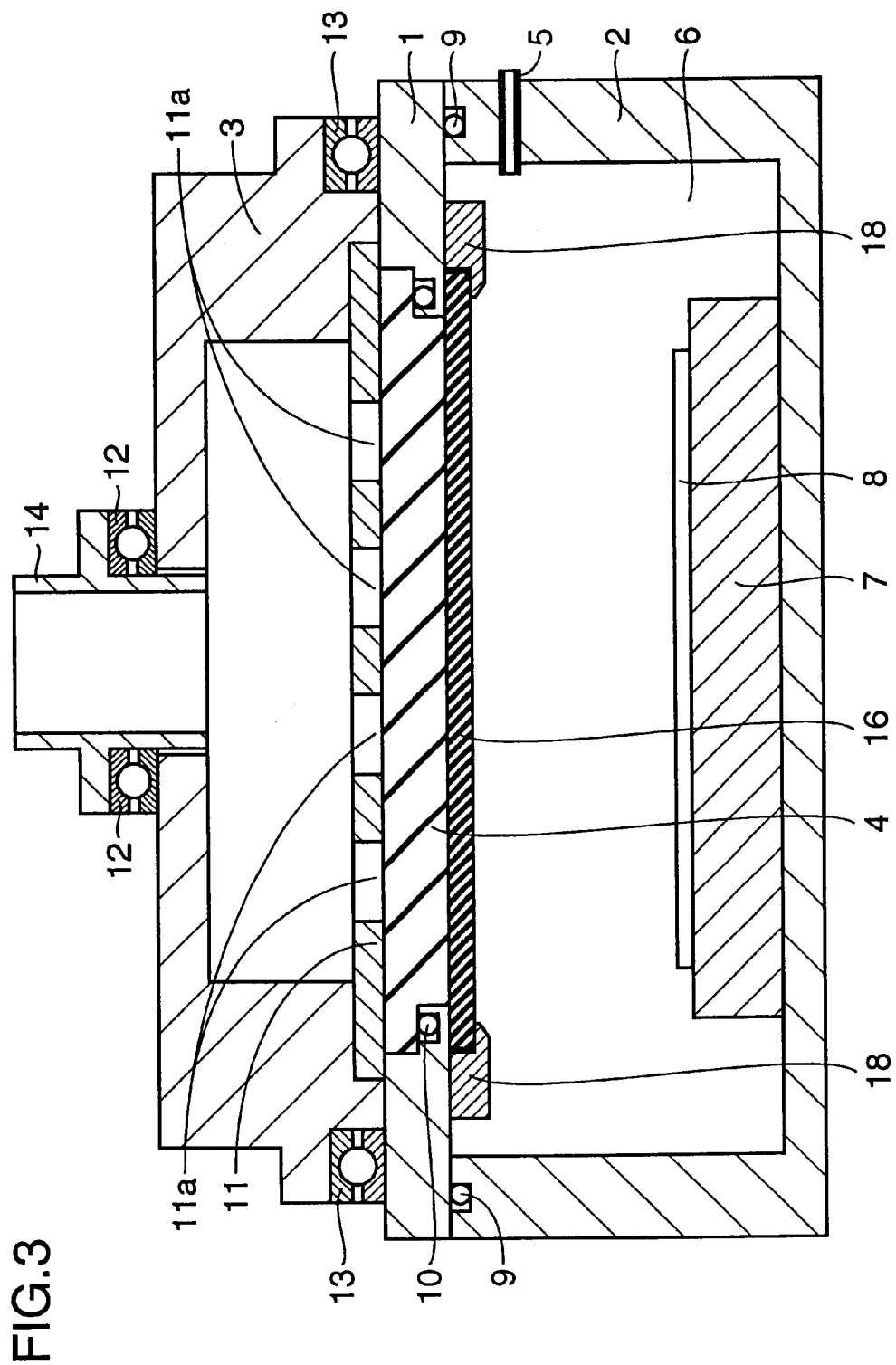
FIG. 3 is a schematic cross section along line III—III in FIG. 2.

Referring to FIGS. 1–3, a plasma processing apparatus according to a first embodiment mainly includes a top lid 1 of a chamber, a chamber body 2, a resonant unit 3, a microwave entrance window 4, a substrate holder 7, a slot plate 11, linear guides 12 and 13, a waveguide 14, a dielectric plate 16, and a dielectric-plate holding member 18.

Top chamber lid 1 is placed on the upper end of chamber body 2, and top chamber lid 1 and chamber body 2 are sealed with an O-ring 9. A slit-shaped opening 1a is formed in top chamber lid 1. Microwave entrance window 4 is made of dielectric such as $SiO_2$, $Al_2O_3$ and AlN with a cross section in the shape like inverted "T" with the boldfaced longitudinal line, and fit in opening 1a. Top chamber lid 1 and microwave entrance window 4 are sealed with an O-ring 10. O-ring 10 thus maintains airtightness within a reaction chamber 6 together with O-ring 9.

On one side of top chamber lid 1 that is exposed to vacuum, dielectric plate 16 made of dielectric such as $SiO_2$, $Al_2O_3$ and AlN is provided. Dielectric-plate holding member 18 formed of a metal plate is provided around the periphery of dielectric plate 16 and fixed to top chamber lid 1 for supporting dielectric plate 16 on top chamber lid 1.

On the other side of top chamber lid 1 that is exposed to the atmosphere, slot plate 11 is provided to cover the upper surface of microwave entrance window 4. A plurality of slots 11a are provided in slot plate 11 to partially expose a surface of microwave entrance window 4. Resonant unit 3 is provided on top chamber lid 1 to cover slot plate 11. Slot plate 11 is fixed to resonant unit 3, and resonant unit 3 is movably attached to top chamber lid 1 via linear guide 13.

Waveguide 14 is connected to an upper part of resonant unit 3 via linear guide 12. Resonant unit 3, top chamber lid 1 and waveguide 14 are connected with metal contacts sufficient enough to prevent microwave from leaking. Accordingly, resonant unit 3 can freely slide, together with slot plate 11, in the direction of arrow A with respect to top chamber lid 1 and waveguide 14, and microwave is directed from waveguide 14 to resonant unit 3 without leaking.

Resonant unit 3 is driven by a driving unit (not shown). Therefore, resonant unit 3 can freely be positioned with respect to top chamber lid 1.

A gas supply tube 5 is provided to chamber body 2. A reactant gas is supplied from gas supply tube 5 into process chamber 6, and the inside of process chamber 6 can be set at a desired gas pressure by means of a vacuum pump (not shown).

Waveguide 14 is connected to a microwave generation source (not shown) to direct microwave generated by the microwave source to resonant unit 3.

In chamber body 2, substrate holder 7 holding a substrate 8 is provided opposite the vacuum side of top chamber lid 1.

Suppose that slot plate 11 has no slot 11a, then a standing wave of the microwave is generated in resonant unit 3. Slot 1a is accordingly positioned directly below the antinode of the standing wave. The antinode of the standing wave refers to a position of the maximum field amplitude of the standing wave. The microwave from resonant unit 3 is radiated into process chamber 6 through slots 11a, microwave entrance window 4 and dielectric plate 16. Then, the reactant gas supplied into process chamber 6 becomes plasma.

A control system of the plasma processing apparatus according to the first embodiment is described below.

Figure 4:
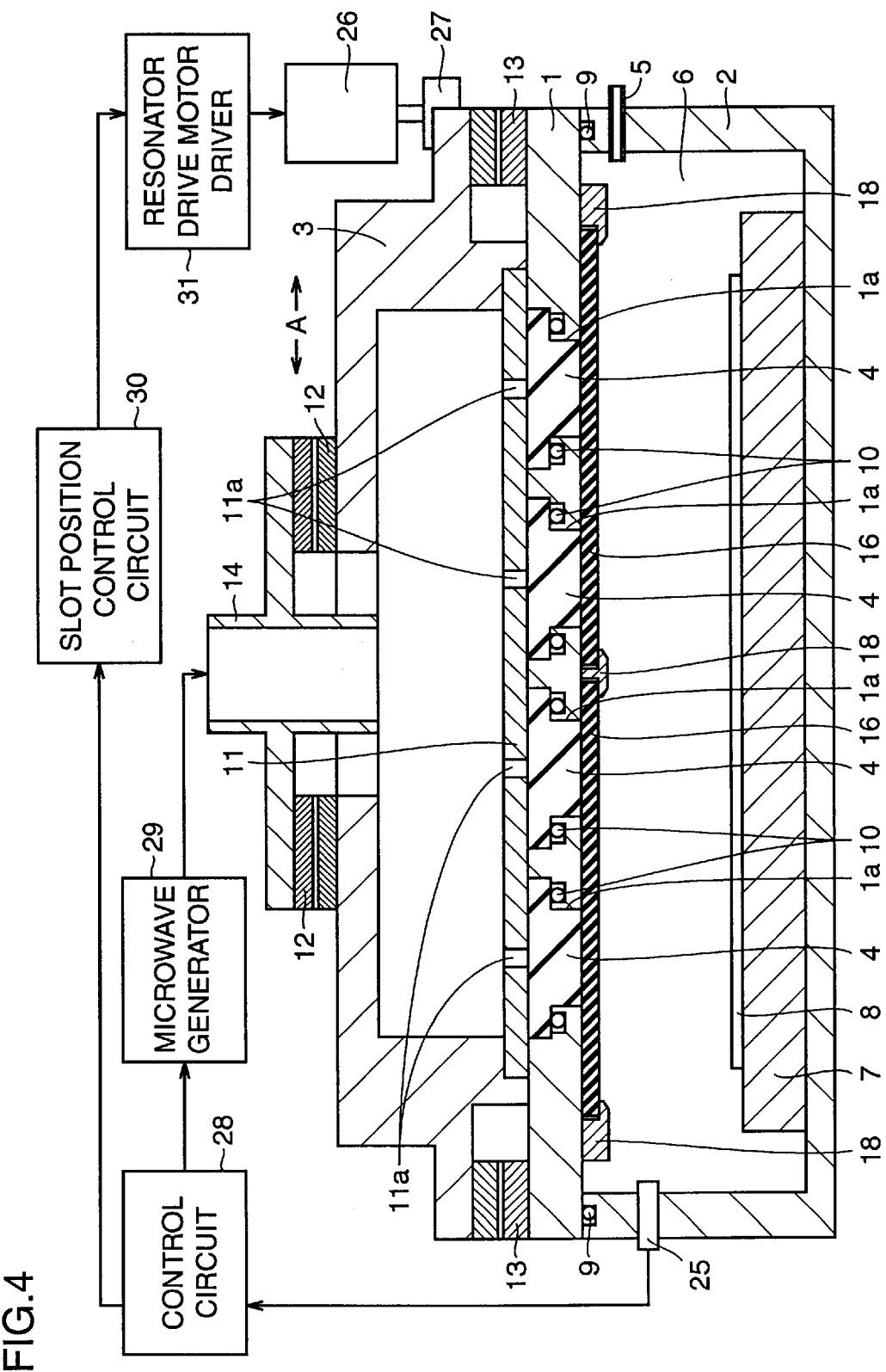
FIG. 4 is a schematic cross section showing the plasma processing apparatus of the first embodiment together with a control system of the apparatus.

Referring to FIG. 4, in order to detect the state of plasma in process chamber 6, a plasma radiation intensity detector 25 is provided to a wall of chamber body 2. The radiation intensity of the plasma can then be detected by means of plasma radiation intensity detector 25.

Information is provided from plasma radiation intensity detector 25 to a control circuit 28 which accordingly adjusts the intensity of a microwave to be supplied as well as the position of slots 11a. Control circuit 28 supplies respective control signals for the microwave intensity and the position of slots 11a to a microwave generator 29 and to a slot position control circuit 30 respectively. Microwave generator 29 generates a microwave according to the control signal from control circuit 28. Slot position control circuit 30 drives a drive motor 26 via a resonator drive motor driver 31 according to the control signal from control circuit 28. Accordingly, slot plate 11 and resonant unit 3 slide in the direction of arrow A.

The radiation intensity detected by plasma radiation intensity detector 25 is used to adjust the intensity of the microwave generated by microwave generator 29.

Specifically, the drive speed of resonant unit 3 is adjusted. For example, resonant unit 3 is driven to decelerate when the radiation intensity is high while resonant unit 3 is driven to accelerate when the radiation intensity is low. Control circuit 28 thus controls microwave generator 29 and slot position control circuit 30 to allow substrate 8 to uniformly be processed.

A drive mechanism for sliding resonant unit 3 and slot plate 11 is specifically described below.

Figure 5:
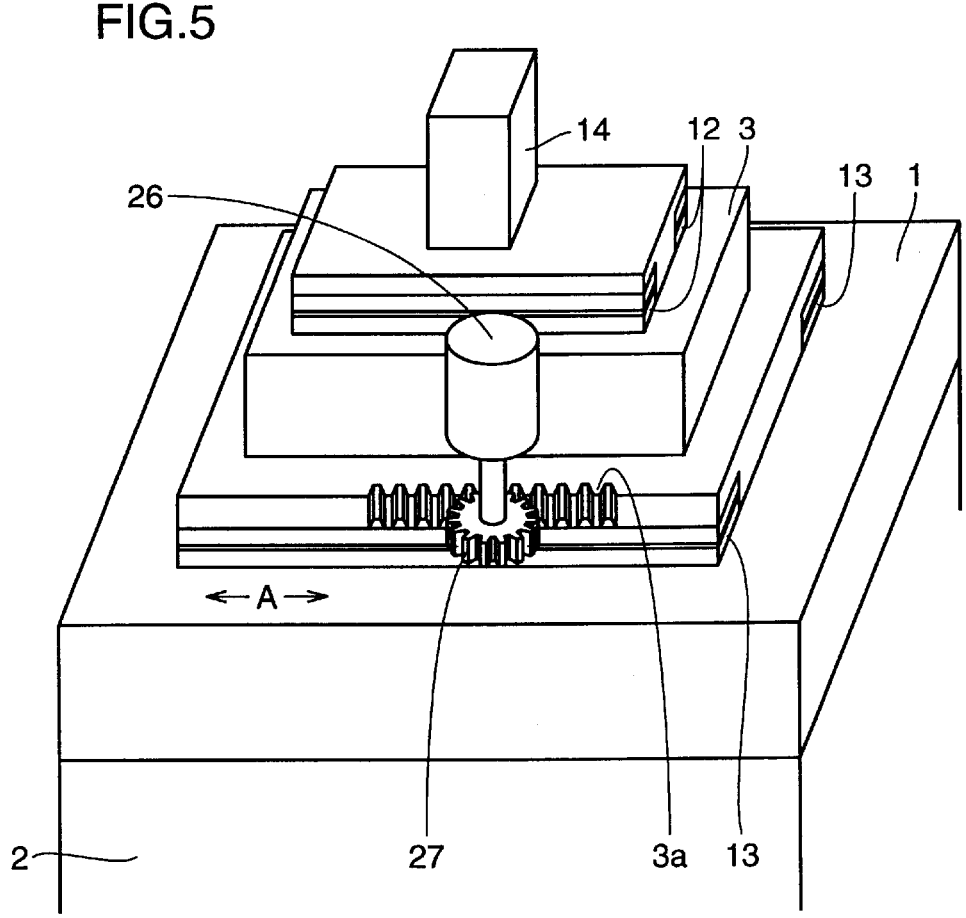
FIG. 5 is a schematic perspective view showing a structure of a resonator drive unit of the plasma processing apparatus according to the first embodiment.

Referring to FIG. 5, resonant unit 3 can freely be moved in the direction of arrow A by linear guides 12 and 13. A rack 3a is provided on one end of resonant unit 3 and a pinion 27 connected to drive motor 26 is engaged with rack 3a. Resonant unit 3 is thus driven by a driving force of motor 26. Moreover, the rotational direction of motor 26 is reversed at a predetermined rate and at predetermined time intervals to slide resonant unit 3 and slot plate 11 forward and backward and accordingly slide a portion where the plasma density is high in process chamber 6.

The resonant unit 3 and slot plate 11 can thus be slid to uniformly plasma-process substrate 8 as explained below in conjunction with FIGS. 6 to 8.

Figure 6:
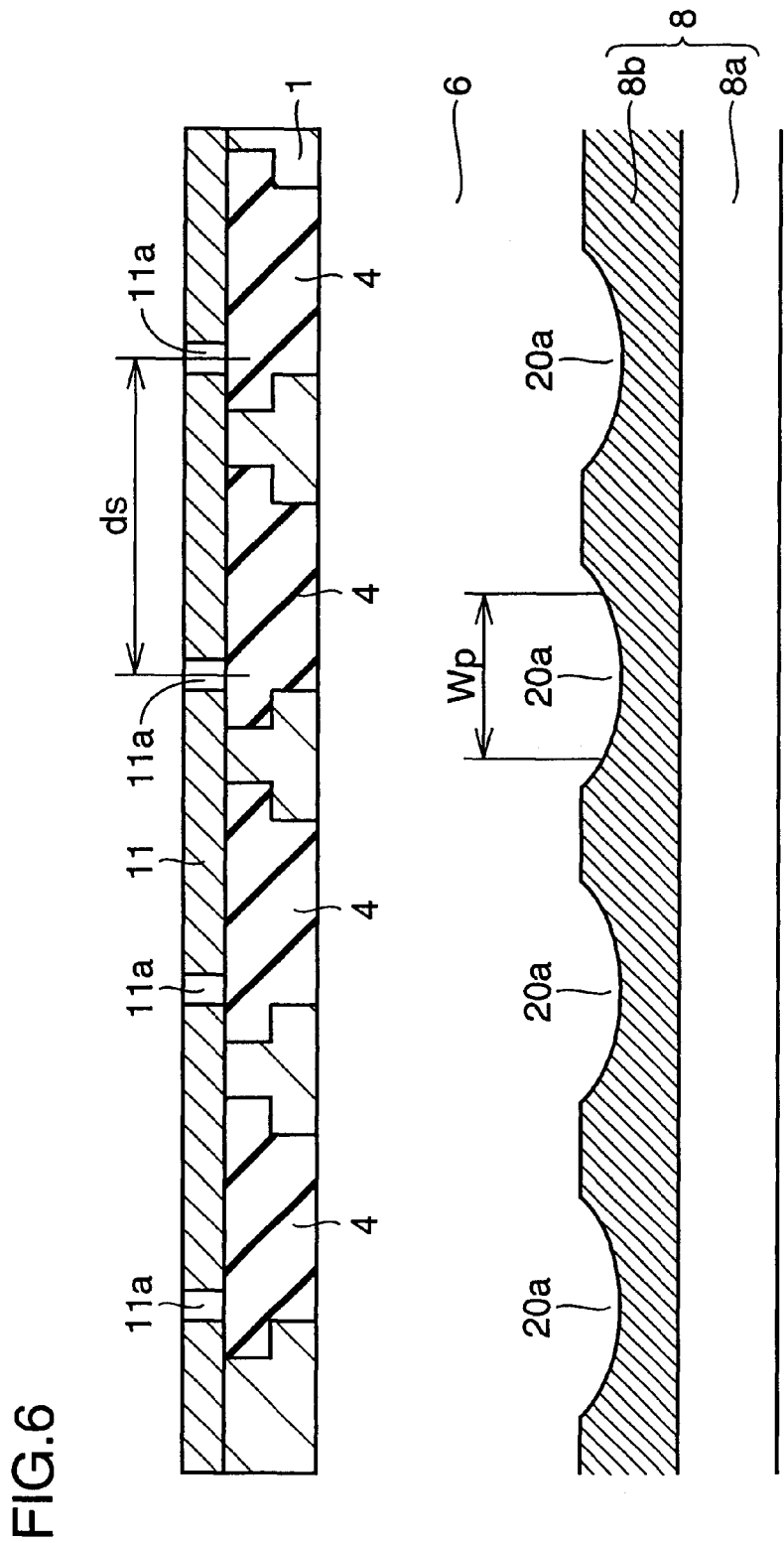
FIGS. 6 to 8 respectively show successive plasma process steps carried out by the plasma processing apparatus of the first embodiment.
Figure 7:
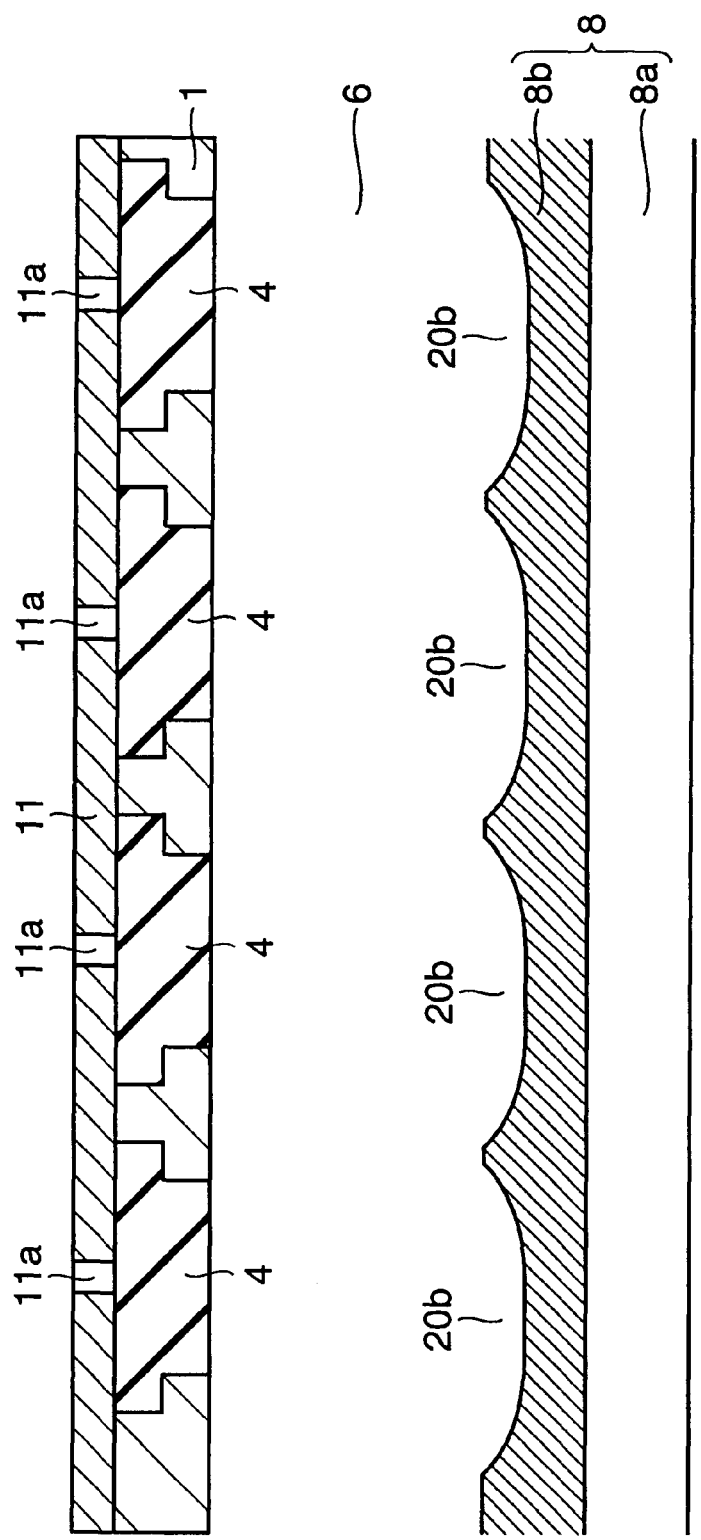
Figure 8:
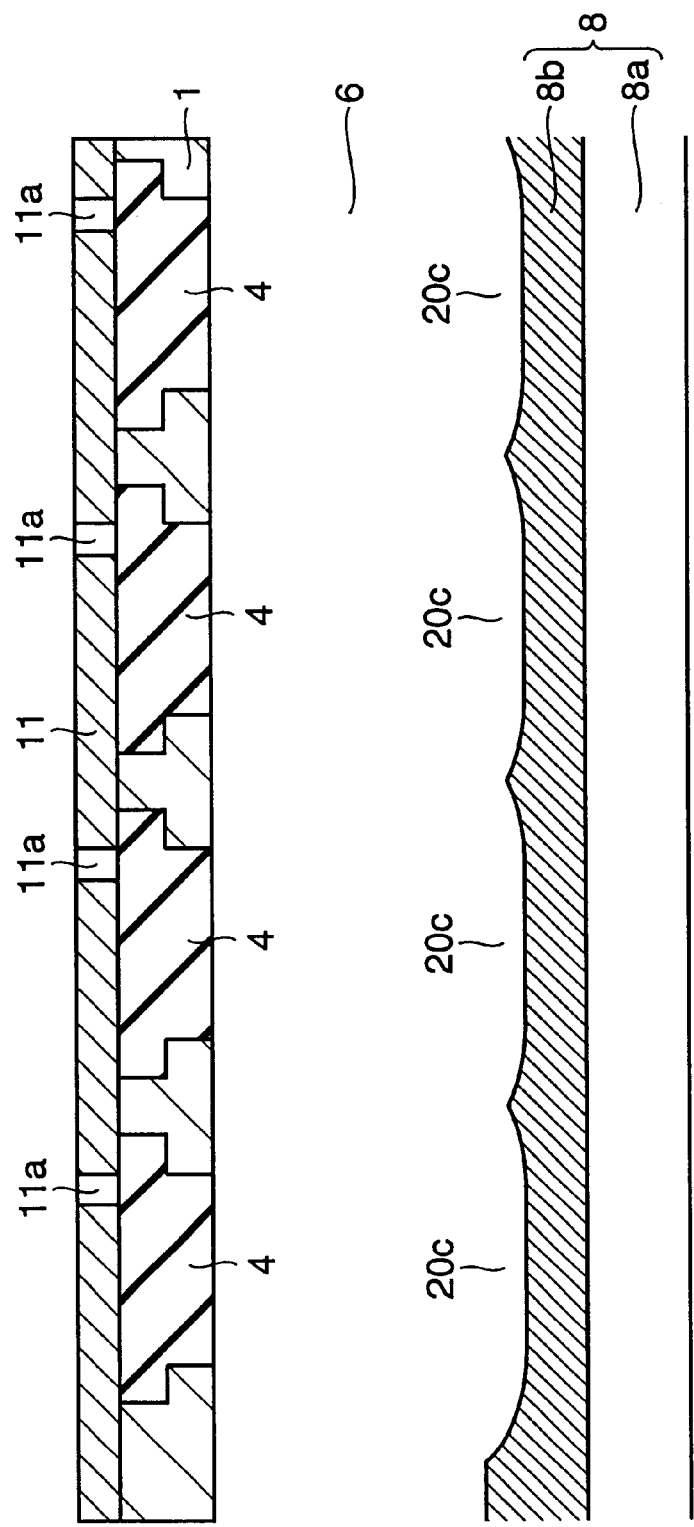

It is noted that dielectric plate 16 and dielectric-plate holding member 18 are not shown in FIGS. 6 to 8 for convenience of explanation.

Referring to FIG. 6, a state of slot plate 11 is shown which has slid leftward in the drawing. With this state of slot plate 11 maintained, a process gas is supplied into process chamber 6 and thereafter a microwave is supplied from slots 11a to be radiated into process chamber 6 through microwave entrance window 4, so that the process gas becomes plasma. The resultant plasma gas is used to etch a film 8b to be processed of substrate 8. The degree of etching within the plane of substrate 8 varies according to the density distribution of the generated plasma. Therefore, an etched portion has its center located directly below slot 11a. The film being etched has a profile 20a shown in FIG. 6.

Referring to FIG. 7, resonant unit 3 and slot plate 11 have slid rightward in the drawing. Accordingly, the positions of slots 11a move rightward in the drawing and thus the microwave is radiated from the position moved rightward. Consequently, the density distribution of the plasma moves following the movement of slots 11a. Then, the film being etched has a profile 20b shown in FIG. 7.

Referring to FIG. 8, slots 11a further move rightward in the drawing to provide a profile 20c of the film being etched. The film is thus etched almost uniformly.

Here, the pitch of slots 11a is denoted by ds (FIG. 6), the width of an etched portion of film 8b is denoted by Wp (FIG. 6) and the width over which slots 11a slide from the position in FIG. 6 to the position in FIG. 8 is denoted by Ws. Then, film 20a to be processed can uniformly be etched when a relation Ws=ds−Wp is satisfied.

When the plasma processing apparatus according to the first embodiment is used as an etching apparatus, the apparatus operates as described below.

Referring to FIG. 4 again, the inside of process chamber 6 is kept in a vacuum state by means of a vacuum pump (not shown). A microwave generated by a microwave generator (not shown) is supplied through waveguide 14 to resonant unit 3 and passed through slots 11a of slot plate 11. As microwave entrance window 4 and dielectric plate 16 made of dielectric such as aluminum transmit the microwave, the microwave passed through slots 11a is transmitted through microwave entrance window 4 and dielectric plate 16 into process chamber 6.

Before the microwave is supplied into process chamber 6, a required process gas is provided from reactant gas inlet 5 into process chamber 6, and a predetermined gas pressure is kept in process chamber 6. In this state, the microwave is directed into process chamber 6 to generate plasma within process chamber 6. The generated plasma has its density according to the field intensity of the microwave radiated from slots 11a into process chamber 6. Then, the plasma density is high at the locations directly below slots 11a respectively.

After plasma radiation intensity detector 25 recognizes that the plasma is generated, resonant unit 3 and slot plate 11 are slid together. The plasma with a certain density distribution is accordingly slid and thus substrate 8 can uniformly be processed.

In addition, substrate 8 can more uniformly be processed by adjustments of the sliding speed of resonant unit 3 and the power of microwave generated by the microwave generator according to the state of the plasma detected by plasma radiation intensity detector 25. In other words, when the plasma radiation intensity is low, the power of microwave generated by the microwave generator is enhanced and simultaneously the sliding speed of resonant unit 3 is decreased. On the contrary, when the plasma radiation intensity is high, the power of microwave generated by the microwave generator is lowered and simultaneously the sliding speed of resonant unit 3 is decreased. Alternatively, the sliding speed of resonant unit 3 may be adjusted after the power of microwave generated by the microwave generator is adjusted, or the microwave power may be adjusted after adjustment of the sliding speed of resonant unit 3. In this way, substrate 8 can more uniformly be plasma-processed.

As discussed above, the plasma processing apparatus according to the first embodiment can provide a uniform plasma process (e.g. etching).

Second Embodiment

Figure 9:
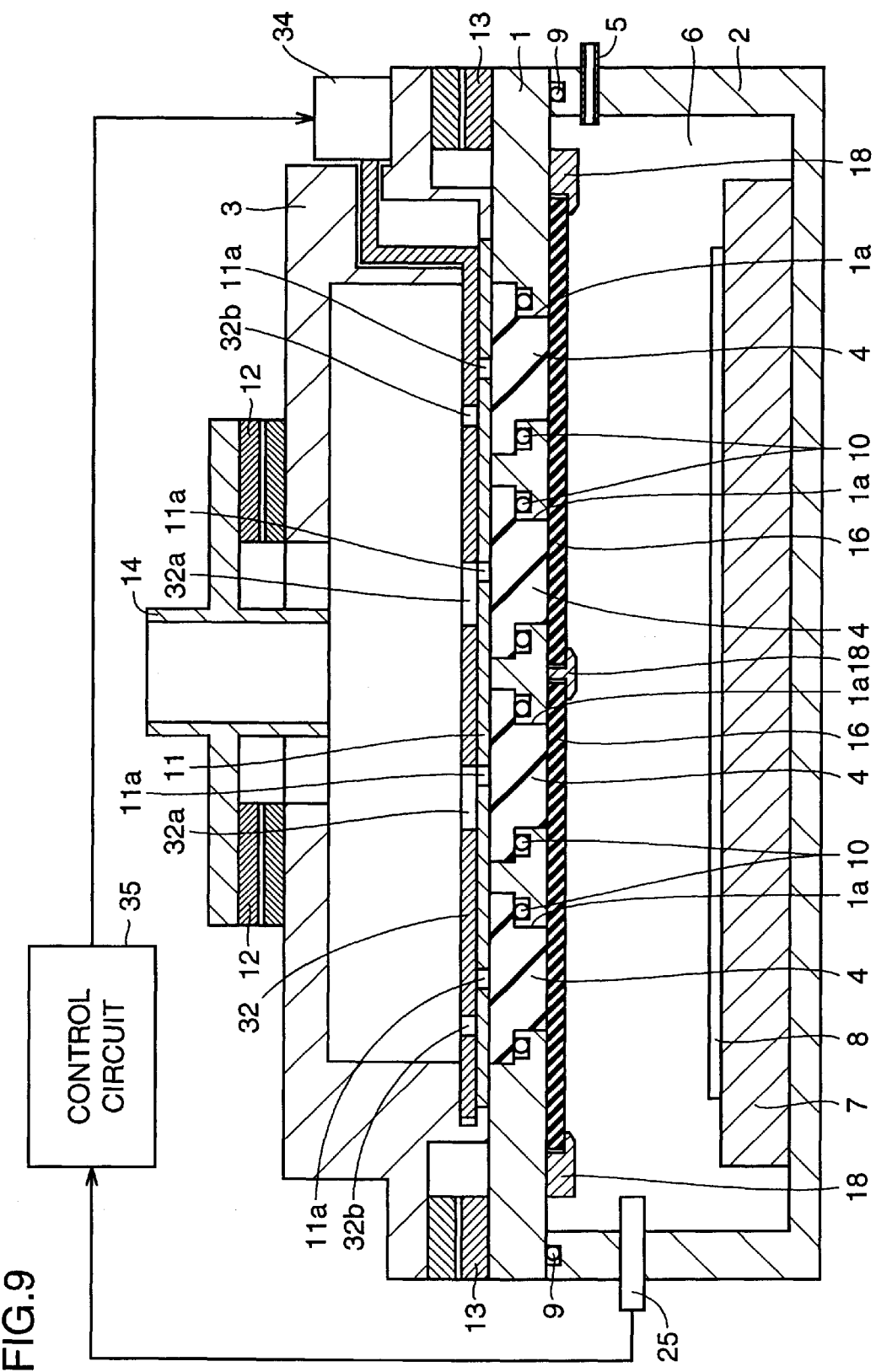
FIG. 9 is a schematic cross section of a plasma processing apparatus according to a second embodiment of the present invention when plasma is generated.

Referring to FIG. 9, a second embodiment differs from the first embodiment in that the former includes a second slot plate 32 added to the structure of the first embodiment. The second slot plate 32 is provided on the upper side of a first slot plate 11 and made slidable with respect to the first slot plate 11 by a slot plate slide mechanism 34. Two types of slots 32a and 32b provided in the second slot plate 32 are different from each other in opening dimensions in the lateral direction in the drawing.

Slot 32a is longer than slot 11a in the direction in which the second slot plate 32 slides. Then, even if the second slot plate 32 slides, slot 32a and slot 11a overlap to provide an opening.

Slot 32b and slot 11a have the same shape or slot 32b is slightly greater than slot 11a. Then, slot 32b and slot 11a overlap to provide an opening when the second slot plate 32 slides in either one of the right and left directions in the drawing.

Other structural components are substantially similar to those of the first embodiment described above. The same components are indicated by the same reference character and description thereof is not repeated here.

According to the second embodiment, when plasma is generated, slot 32a and slot 11a overlap and slot 32b and slot 11a do not overlap as shown in FIG. 9. After generation of the plasma is detected, both of the slots 32a and 32b overlap respective slots 11a as shown in FIG. 10.

When the plasma is generated, the second slot plate 32 is positioned according to the second embodiment so that only the slot 32a of the second slot plate 32 overlaps slot 11a while slot 32b and slot 11a do not overlap as shown in FIG. 9. A microwave is supplied into resonant unit 3 in this state in which a smaller number of openings of microwave entrance window 4 open into the resonant space. Therefore, the microwave of a higher field intensity is radiated into process chamber 6, which facilitates plasma generation.

A plasma radiation intensity detector 25 then detects that the plasma is generated. Accordingly, a control circuit 35 orders slot plate slide mechanism 34 to slide the second slot plate 32 according to a detection signal from plasma radiation intensity detector 25. The second slot plate 32 thus slides rightward in the drawing to enter the state shown in FIG. 10.

Figure 10:
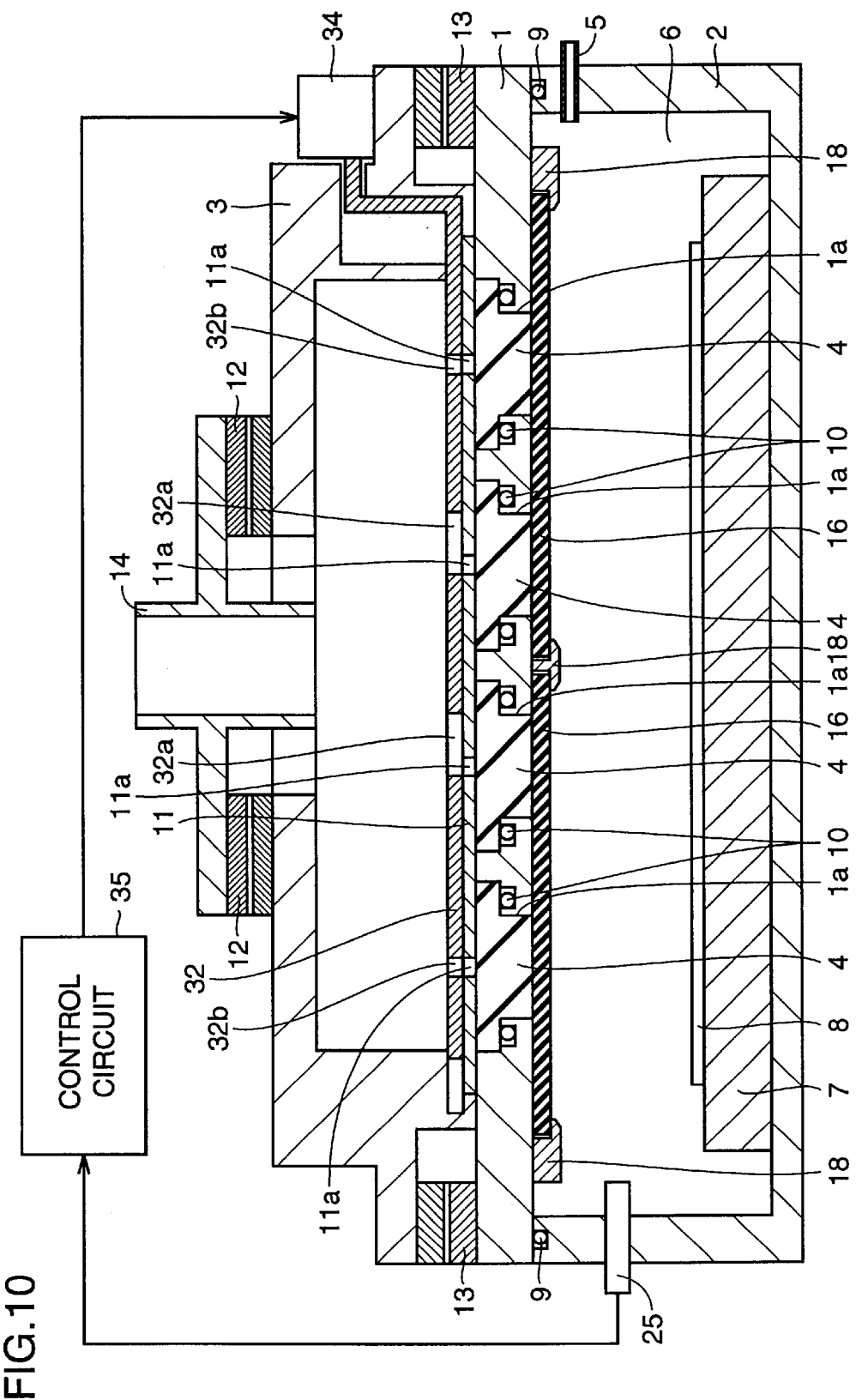
FIG. 10 is the schematic cross section of the plasma processing apparatus of the second embodiment after the plasma generation is recognized.

Referring to FIG. 10, slots 32a and 32b of the second slot plate 32 overlap respective slots 11a. Then, the number of openings of dielectric window 4 opening into the resonant space can be increased compared with that shown in FIG. 9. Moreover, the window openings are uniformly distributed for a substrate 8 of a large area. In this state, a resonant unit 3 and the first and second slot plates 11 and 32 are slid together with respect to substrate 8. Accordingly, any part of substrate 8 that is to be processed can uniformly be processed by the plasma.

As discussed above, the plasma processing apparatus according to the second embodiment can be used to surely generate plasma and perform a uniform plasma process.

Third Embodiment

Figure 11:
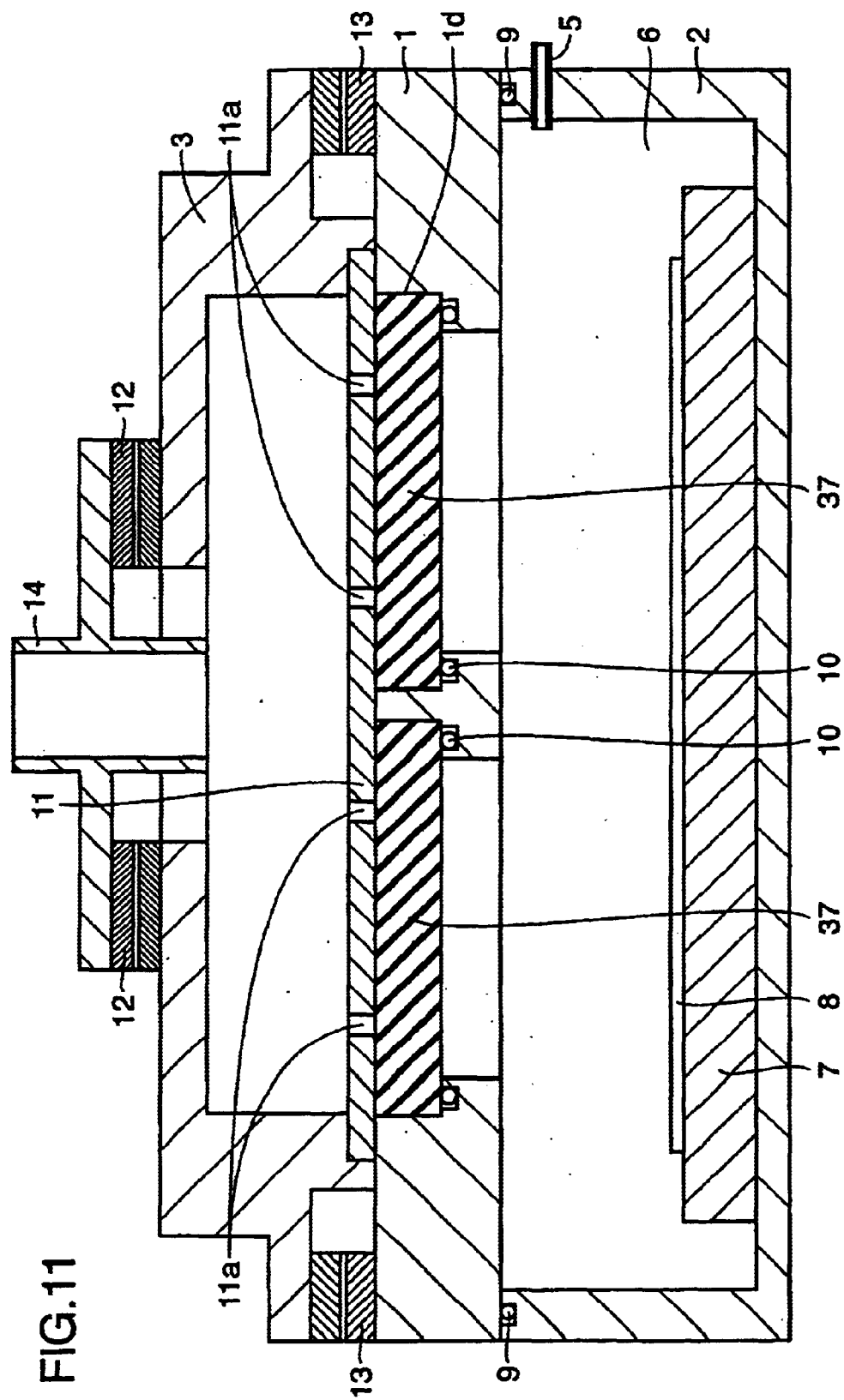
FIG. 11 is a schematic cross section showing a structure of a plasma processing apparatus according to a third embodiment of the present invention.

Referring to FIG. 11, a third embodiment differs from the first embodiment in the shape of the microwave entrance window. A rectangular hole 1d is provided in a top chamber lid 1. A dielectric plate (microwave entrance window) 37 made of dielectric such as $Al_2O_3$ is fit in hole 1d and sealed by an O-ring 10. On one side of microwave entrance window 37 that is exposed to vacuum, no dielectric plate and no support member for supporting the dielectric plate are provided.

Other structural components are substantially similar to those of the first embodiment described above. The same components are indicated by the same reference character and description thereof is not repeated.

According to the third embodiment, O-rings 9 and 10 serve to maintain a vacuum state within a process chamber 6 and a microwave is guided into a resonant unit 3. The microwave radiated from slots 11a of a slot plate 11 is dispersed within dielectric plate 37 to be radiated into process chamber 6. Accordingly, a process gas provided from a gas inlet 5 into process chamber 6 is excited to generate plasma. After the plasma is generated, resonant unit 3 and slot plate 11 are slid together. A substrate can thus be processed uniformly by the plasma.

Fourth Embodiment

Figure 12:
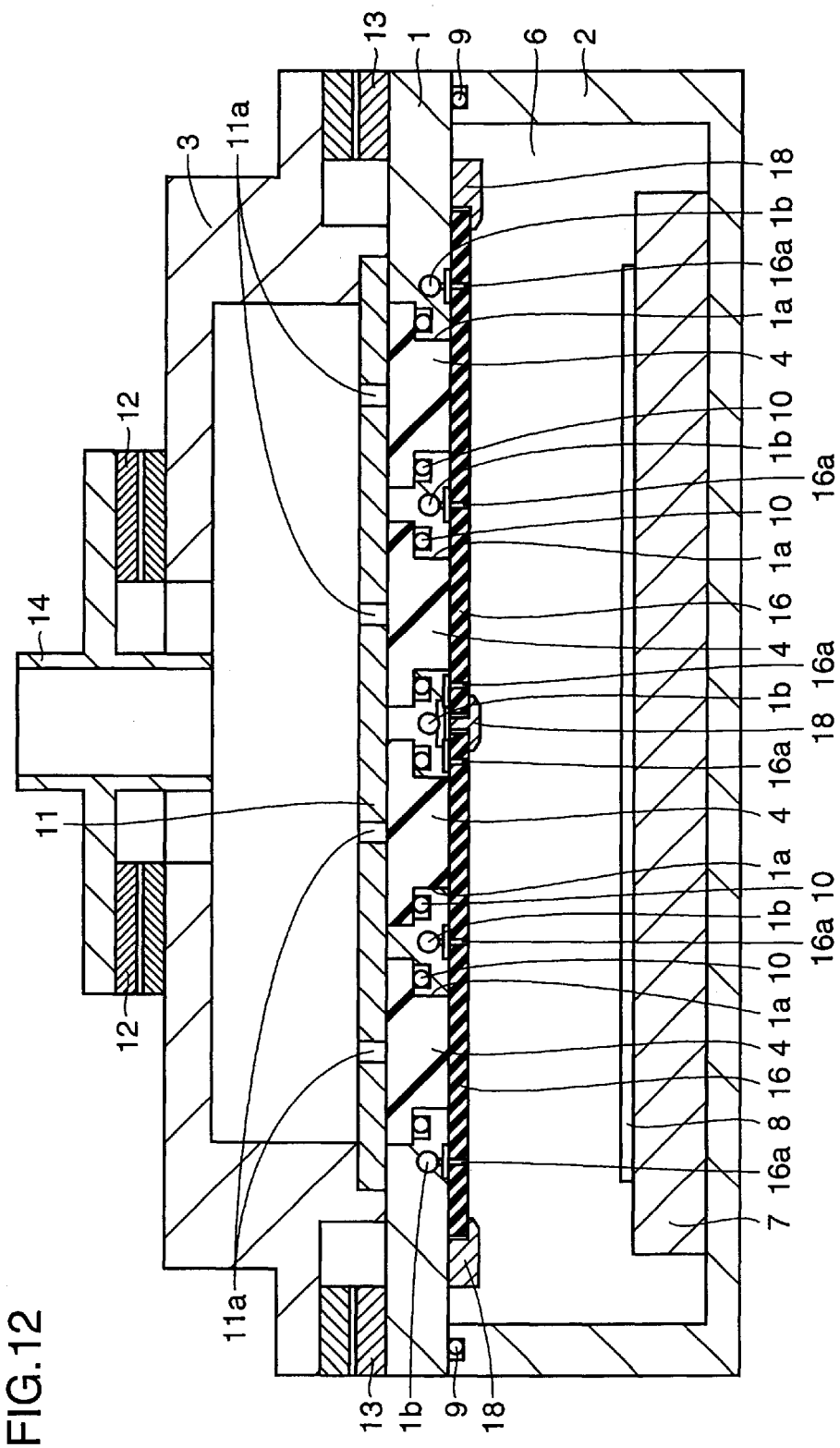
FIG. 12 is a schematic cross section showing a structure of a plasma processing apparatus according to a fourth embodiment of the present invention.
Figure 13:
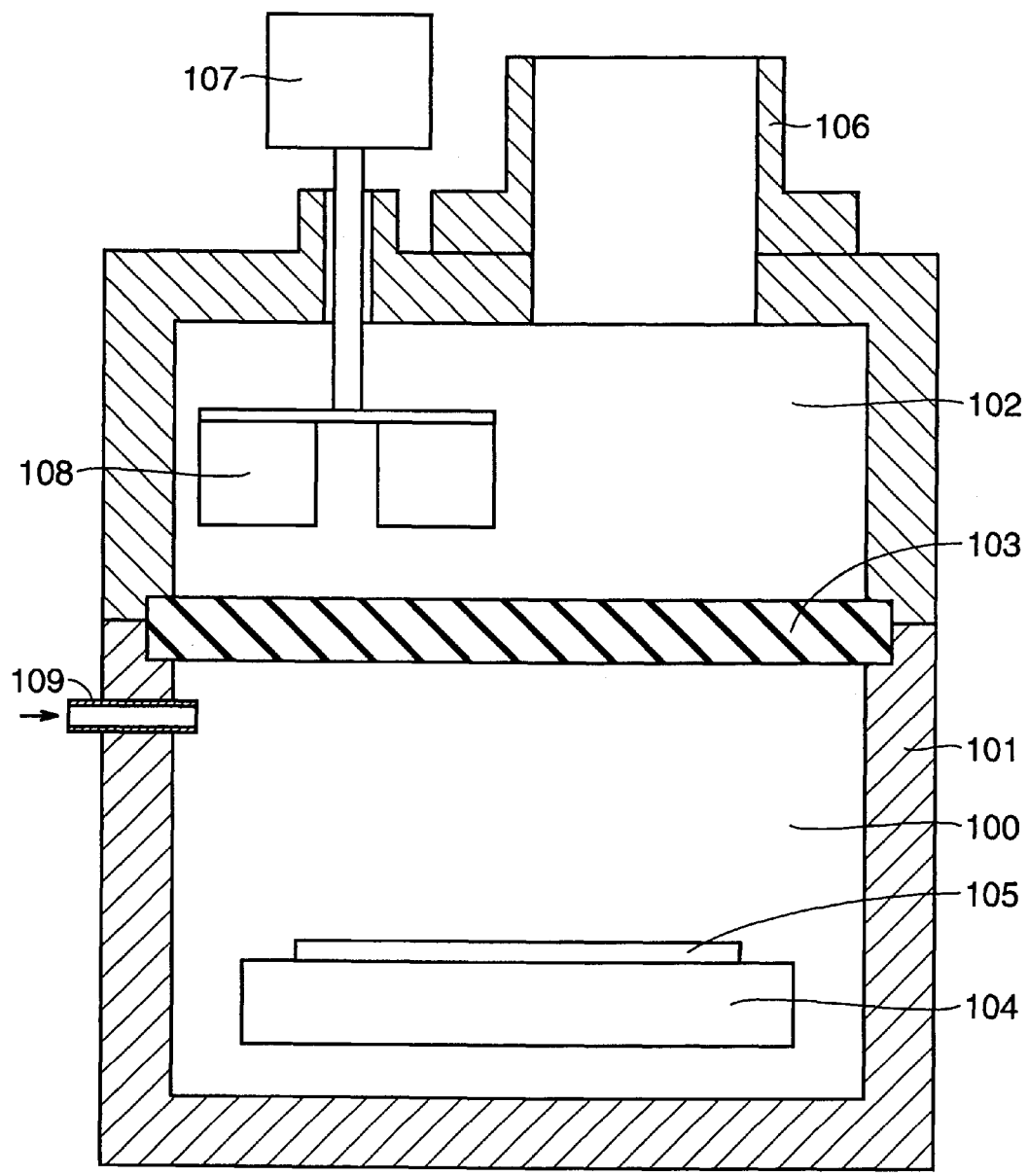
FIG. 13 is a schematic cross section showing a structure of a plasma processing apparatus disclosed in Japanese Patent Laying-Open No. 5-36641.
Figure 14:
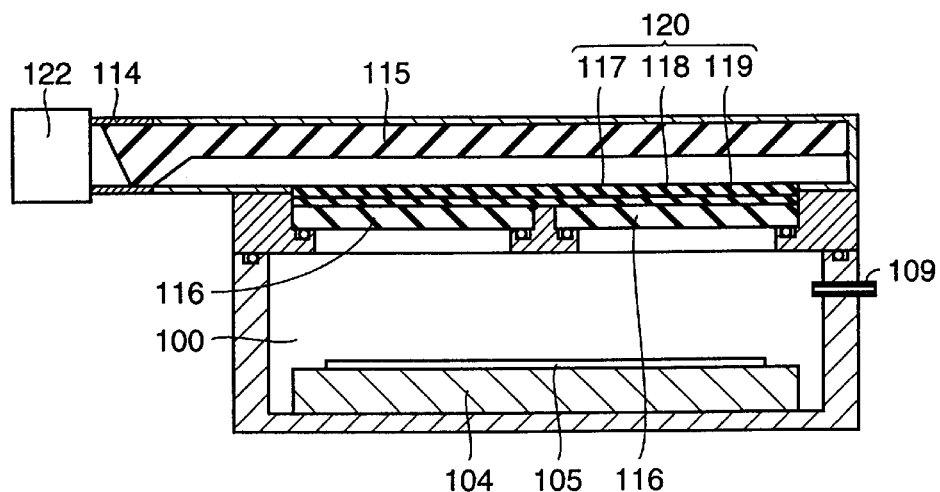
FIG. 14 is a schematic cross section showing a structure of a plasma processing apparatus disclosed in Japanese Patent Laying-Open No. 2000-91097.
Figure 15:
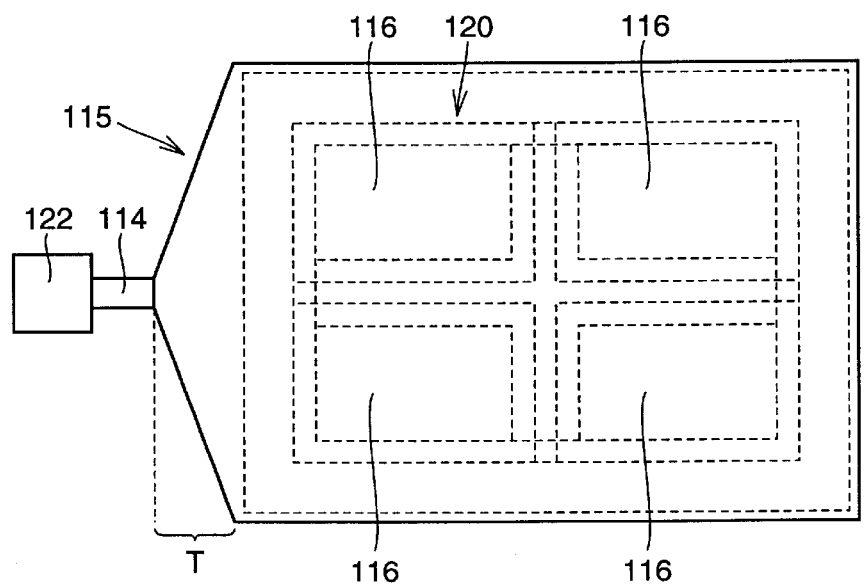
FIG. 15 is a schematic plan view of the structure of the plasma processing apparatus disclosed in Japanese Patent Laying-Open No. 2000-91097.
Figure 16:
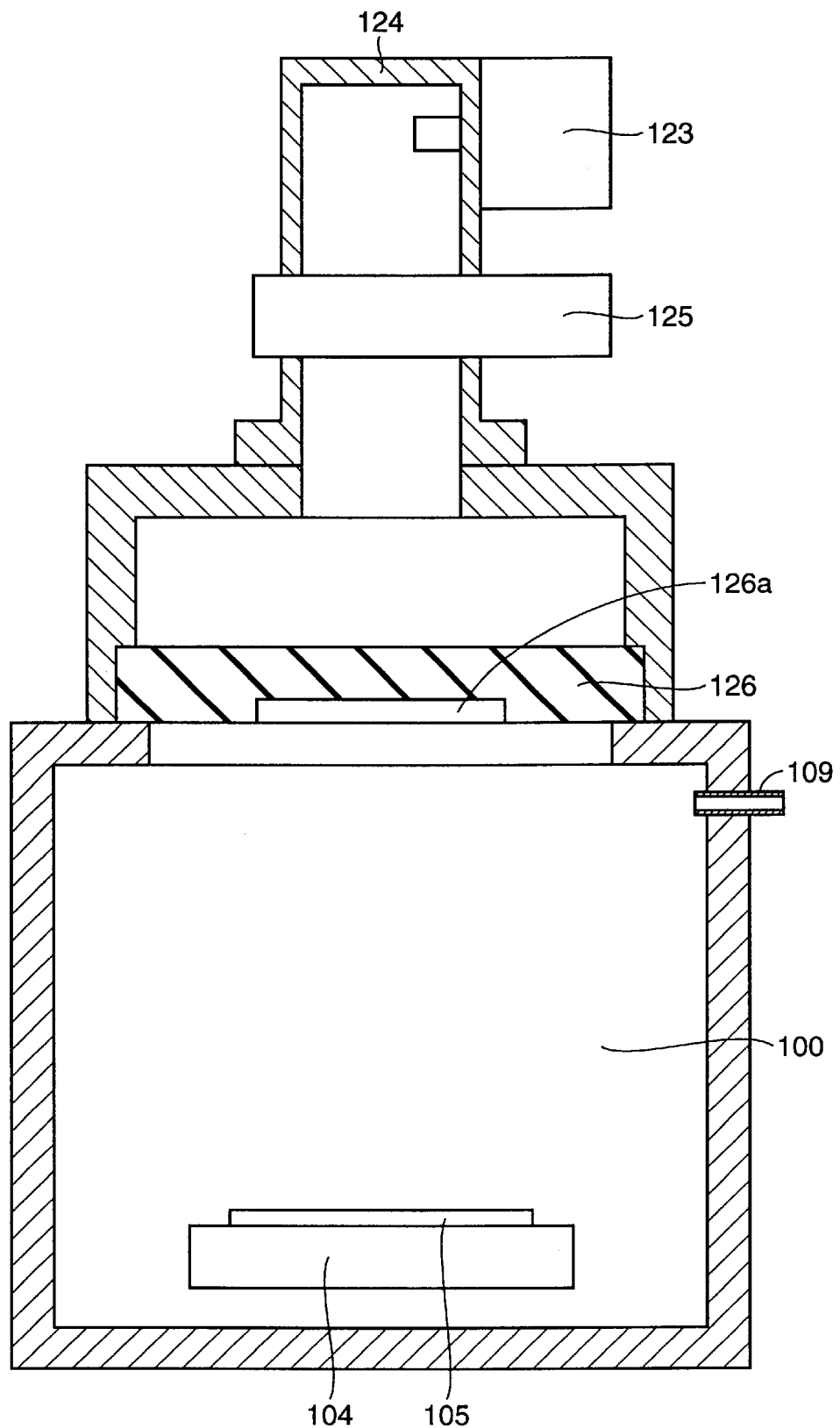
FIG. 16 is a schematic cross section showing a structure of a plasma processing apparatus disclosed in Japanese Patent Laying-Open No. 9-232099.

Referring to FIG. 12, a fourth embodiment differs from the first embodiment in that the former has a gas channel 16a in a dielectric plate 16 which then serves as a shower plate.

Shower plate 16 is fixed by a dielectric plate holding member 18 to contact a microwave entrance window 4. Shower plate 16 made of dielectric such as $Al_2O_3$ includes numerous gas discharge outlets 16a for discharging a process gas. The numerous gas discharge outlets 16a communicate with a gas channel 1b provided in a top chamber lid 1.

Other structural components are substantially similar to those of the first embodiment described above. The same components are indicated by the same reference character and description thereof is not repeated.

According to the fourth embodiment, a process gas can uniformly be supplied to a substrate 8 of a large area and thus the substrate can uniformly be processed by plasma. This is particularly advantageous for a CVD (Chemical Vapor Deposition) process requiring the gas to uniformly be supplied.

As described above, the plasma processing apparatus according to the fourth embodiment can be used to uniformly process a substrate by plasma.

Although the plasma processing apparatus applied to an etching apparatus has been described above, the plasma processing apparatus is not limited thereto. For example, the plasma processing apparatus is naturally applicable to a CVD apparatus.

As heretofore discussed, the plasma processing apparatus according to the present invention can perform a uniform plasma process by sliding the resonant unit and the slot plate all together.

In addition, depending on the state of plasma, the power of microwave to be supplied as well as the sliding speed of the resonant unit are adjusted to achieve a more uniform plasma process.

Moreover, the number of slots that are open when plasma is generated and that when the plasma is maintained can be made different from each other and thus the plasma can surely be generated.

In this way, the plasma processing apparatus according to the present invention can ensure generation of plasma and can uniformly process a substrate by the plasma.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A plasma processing apparatus comprising:

a process chamber for processing by means of plasma;

microwave supply means having a resonant unit oscillating microwave, for supplying the oscillated microwave into said process chamber;

a slot plate provided between said resonant unit and said process chamber and having an opening for passing the oscillated microwave to said process chamber; and slide means for sliding said resonant unit and said slot plate all together with respect to said process chamber.

2. The plasma processing apparatus according to claim 1, further comprising plasma state detection means for detecting a plasma state within said process chamber, wherein according to information about the plasma state supplied from said plasma state detection means, the speed at which said resonant unit is slid by said slide means can be changed.

3. The plasma processing apparatus according to claim 2, wherein according to information about the plasma state supplied from said plasma state detection means, the intensity of the microwave supplied by said microwave supply means into said process chamber is adjusted.

4. The plasma processing apparatus according to claim 2, wherein said plasma state detection means measures the intensity of plasma radiation.

5. The plasma processing apparatus according to claim 1, wherein said slot plate has a plurality of said openings, and the distance over which said resonant unit and said slot plate are slid by said slide means is smaller than the pitch between said openings.

* * * * *